(12) United States Patent
Martinez-Botas et al.

(10) Patent No.: US 9,388,707 B2
(45) Date of Patent: Jul. 12, 2016

(54) PASSIVELY CONTROLLED TURBOCHARGER

(75) Inventors: Ricardo Martinez-Botas, London (GB); Srithar Rajoo, Johor (MY); Apostolos Pesiridis, London (GB); Harminder Flora, London (GB)

(73) Assignee: IMPERIAL INNOVATIONS LIMITED, London (GB)

( * ) Notice: Subject to any disclaimer, the term of this patent is extended or adjusted under 35 U.S.C. 154(b) by 1120 days.

(21) Appl. No.: 12/596,233

(22) PCT Filed: Apr. 18, 2008

(86) PCT No.: PCT/GB2008/001377
§ 371 (c)(1),
(2), (4) Date: Aug. 9, 2010

(87) PCT Pub. No.: WO2008/129274
PCT Pub. Date: Oct. 30, 2008

(65) Prior Publication Data
US 2010/0293942 A1 Nov. 25, 2010

(30) Foreign Application Priority Data
Apr. 18, 2007 (GB) .................................. 0707501.3

(51) Int. Cl.
*F04D 29/46* (2006.01)
*F01D 17/16* (2006.01)

(52) U.S. Cl.
CPC .......... *F01D 17/165* (2013.01); *F05D 2220/40* (2013.01); *F05D 2260/30* (2013.01); *F05D 2260/52* (2013.01); *F05D 2270/42* (2013.01)

(58) Field of Classification Search
CPC .............. F01D 17/165; F05D 2220/40; F05D 2260/30; F05D 2260/52; F05D 2270/42
USPC ........... 415/146, 147, 148, 141, 158, 159, 17, 415/26, 48
See application file for complete search history.

(56) References Cited

U.S. PATENT DOCUMENTS

| | | | | |
|---|---|---|---|---|
| 2,320,721 A * | 6/1943 | Ericson | ........................ | 74/574.1 |
| 3,173,241 A | 3/1965 | Birmann | | |
| 4,324,526 A * | 4/1982 | Berchtold et al. | ............... | 415/48 |
| 4,499,731 A * | 2/1985 | Moser | ............... | 60/602 |
| 4,961,319 A * | 10/1990 | Lyon | ............... | 60/602 |
| 5,605,435 A | 2/1997 | Haugen | | |
| 6,895,750 B2 * | 5/2005 | Ando et al. | ..................... | 60/602 |
| 8,172,517 B2 * | 5/2012 | Lighty | ............... | 415/156 |
| 2005/0254938 A1 * | 11/2005 | Sheath et al. | .................. | 415/160 |
| 2007/0003408 A1 | 1/2007 | Lim | | |

FOREIGN PATENT DOCUMENTS

| | | |
|---|---|---|
| EP | 1645727 A | 4/2006 |
| JP | S63130637 | 8/1988 |
| WO | 2004022924 A1 | 3/2004 |
| WO | 2006061588 A1 | 6/2006 |

* cited by examiner

*Primary Examiner* — Dwayne J White
*Assistant Examiner* — Kayla McCaffrey
(74) *Attorney, Agent, or Firm* — Dorsey & Whitney LLP

(57) ABSTRACT

A flow control device for a turbocharger, the flow control device comprising a variably restricting flow restrictor for restricting flow in a turbocharger inlet by a variable amount, the flow control device being arranged such that the flow restrictor position varies flow restriction in response to force acting on a surface of the flow restrictor caused by a pressure pulse in a flow direction, the flow restrictor being biased in a direction opposed to the flow direction.

18 Claims, 10 Drawing Sheets

| 20Hz Pulsation and ~30000rpm | | | |
|---|---|---|---|
| Settings | Cycle Average Power (kW) | Average Power (kW) A | Average Power (kW) B |
| Case 1 | 8.91 | 23.55 | 1.89 |
| Case 2 | 8.62 | 21.83 | 2.24 |
| Case 3 | 8.43 | 18.36 | 3.64 |
| 70deg | 8.34 | 18.47 | 3.62 |
| 65deg | 8.39 | 19.91 | 2.98 |
| 60deg | 8.27 | 21.34 | 2.05 |
| 50deg | 8.19 | 21.98 | 1.54 |
| 40deg | 8.22 | 22.41 | 1.45 |

FIG. 10F

PASSIVELY CONTROLLED TURBOCHARGER

The invention relates to a flow control device for a turbocharger.

The use of turbochargers is well known in gasoline and diesel internal combustion engines. A turbocharger pressurises an intake air stream by using the heat and volumetric flow of exhaust gas exiting the engine. The air stream is routed to a combustion chamber of the engine via an air compressor which is driven by the exhaust gas flow. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotary action of the turbine also causes the air compressor to spin within a compressor housing of the turbocharger that is separate from the exhaust housing. The spinning action of the air compressor causes intake air to enter the compressor housing and be pressurised a desired amount before it is mixed with fuel and combusted within the engine combustion chamber.

The amount by which the intake air is pressurised is controlled by regulating the amount of exhaust gas that is passed through the turbine housing by a wastegate and/or by selectively opening or closing an exhaust gas channel or passage to the turbine running through the turbine housing. Turbochargers that are constructed having such adjustable exhaust gas channels are referred to in industry as variable geometry turbines (VGTs). A VGT typically includes a movable member that is positioned within a turbine housing between the exhaust gas source and the turbine. The movable member is actuated from outside of the turbine housing by a suitable actuating mechanism to increase or decrease the volumetric flowrate of exhaust gas to the turbine as called for by the current engine operating conditions which may be, for example, engine speed, engine load, boost (compressor) pressure or differential pressure across the engine. Increasing or decreasing the volumetric flowrate of exhaust gas to the turbine respectively increases or decreases the intake air boost pressure generated by the compressor mounted on the opposite end of the turbine shaft.

Such conventional VGTs have become quite popular for matching turbine inlet geometry to the characteristics of the exhaust gas stream throughout the engine operating range beyond the selected optimum design point for fixed geometry turbochargers. This has led (especially in combination with matched Exhaust Gas Recirculation systems) to a reduction in particle emissions, higher boost (especially at lower speeds) and low load conditions, leading therefore to increased available torque and improved acceleration at the lower part of the engine operating envelope. In addition, turbocharger lag performance has improved dramatically.

The problem remains that although VGTs can alter turbocharger geometry according to engine operating conditions they do not take full advantage of the energy available. If more energy was recovered during each exhaust process period, this could raise the amount of energy absorbed by the turbine and therefore the turbocharger could extract more power under the same engine operating conditions.

A development which has demonstrated improved energy recovery is to actively control exhaust gas flow by controlling the positioning of the moveable member in a turbocharger dependent on a measure of exhaust gas inlet pressure, as disclosed in WO2006/061588.

However, this active control requires the added complications of sensing components, control circuitry and an energy consuming driving device to alter the position of the moveable member. Only a limited improvement in energy recovery is possible before the energy consumption of the driving device outweighs any energy recovery.

The invention is set out in the claims.

Because the flow control device is arranged such that the flow restrictor position varies in response to force acting on a surface of the flow restrictor caused by incoming pressure pulses, control of exhaust gas flow is provided passively, based on the natural oscillation of the flow restrictor in response to the pressure pulses of the incoming exhaust gas impacting on the flow restrictor surface caused by an opposing bias. This reduces the need for sensors and electronic control means in the system and provides improved use of the available energy by the turbocharger.

Examples of the present invention will now be described, with reference to the accompanying drawings, in which:

FIG. 2b is a side view of the pivoting vane in FIG. 2a;

FIG. 7b shows a side perspective view of adjacent vanes at point E in FIG. 7a;

FIG. 7c shows an upper perspective view of adjacent vanes at point E in FIG. 7a;

FIG. 10f is a table showing average power values for the results shown in FIGS. 10d and 10e.

Figure 1:
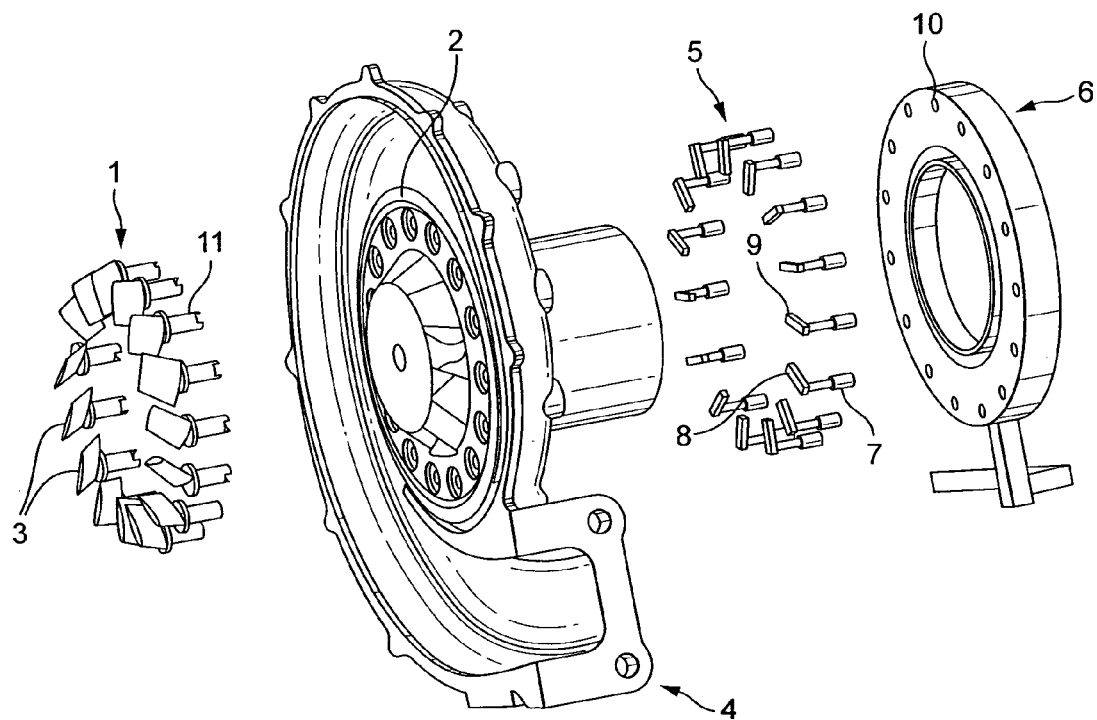
FIG. 1 is an exploded view of an example pivoting vane flow restricting member.

A first example flow control device, shown in FIGS. 1 to 6b, comprises a pivoting nozzle vane ring 1, which functions as a flow restrictor, fixed to turbine stator 2. As shown in FIG.

1, the vane ring 1 comprises a plurality of vanes 3 and is constructed to fit into a mixed-flow turbine 4 by means of vane pivoting pins 5 and a pivoting mechanism disk 6. Each pivoting pin 5 comprises an axial arm 7 (extending parallel to the axial direction in the turbine 4) and a radially inward arm 8, the distal end 9 of which is fixed against non-rotational movement. The axial arms 7 are mounted in holes 10 in the pivoting mechanism disk 6. Each vane 3 is affixed to an axial vane arm 11, which is mounted in the distal end 9 of the corresponding radially inward arm 8.

Figure 2A:
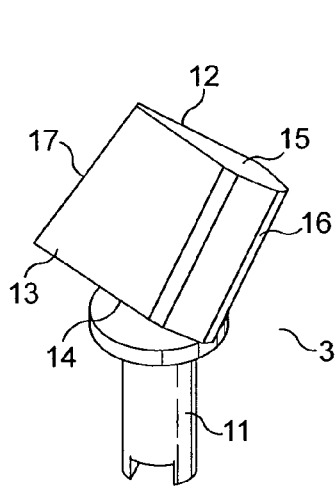
FIG. 2a is a perspective view of an example pivoting vane.
Figure 2B:
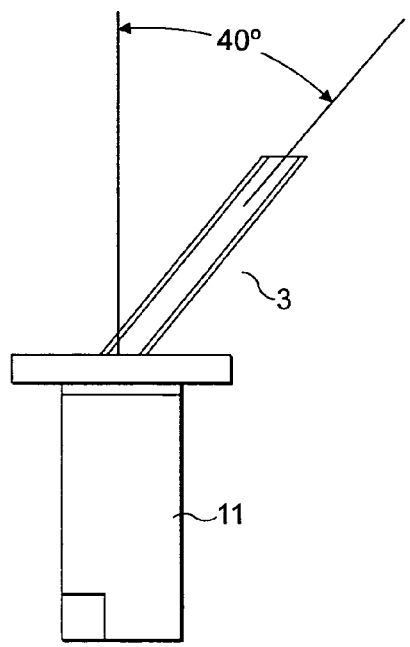
Figure 3:
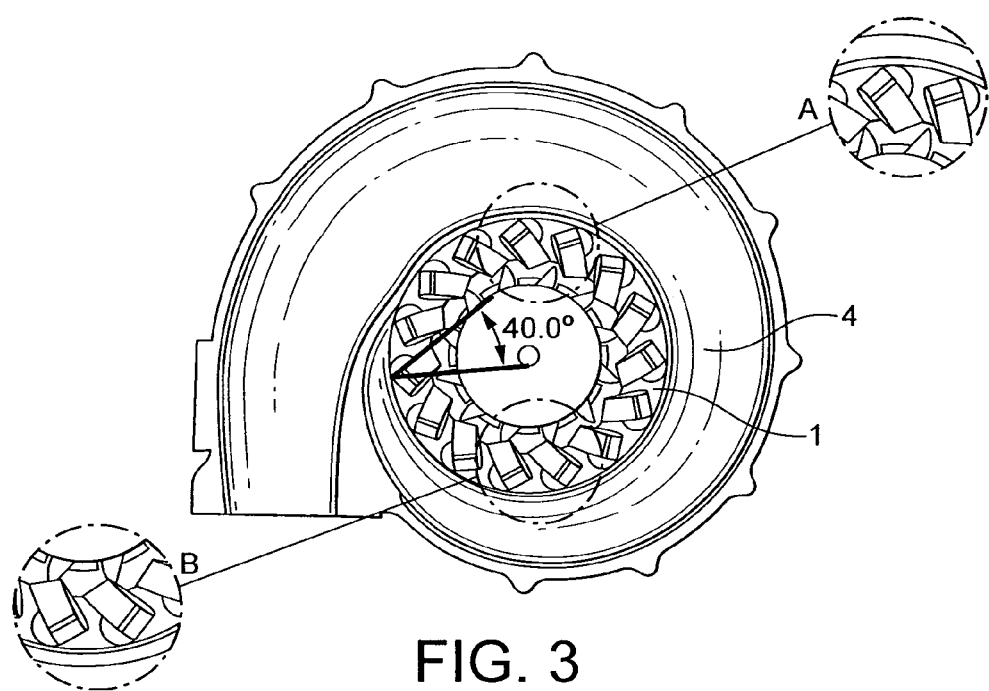
FIG. 3 is a front view of a pivoting vane ring assembly at a fully open position (40 degrees from radial)
Figure 4A:
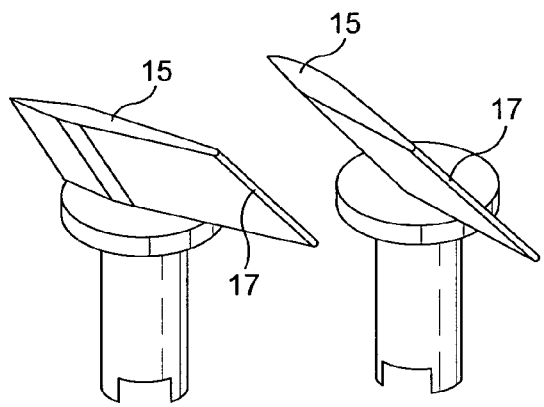
FIG. 4a shows the relative positioning of adjacent vanes at position A in FIG. 3.
Figure 4B:
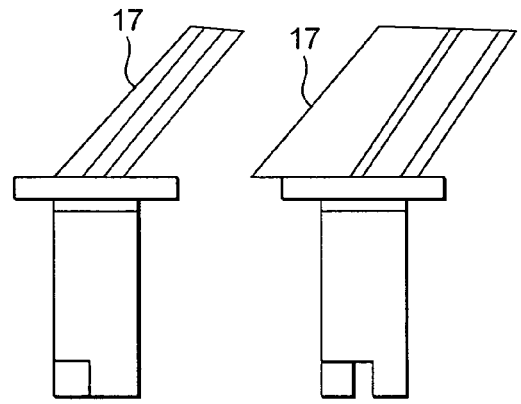
FIG. 4b shows the relative positioning of adjacent vanes at position B in FIG. 3.
Figure 5:
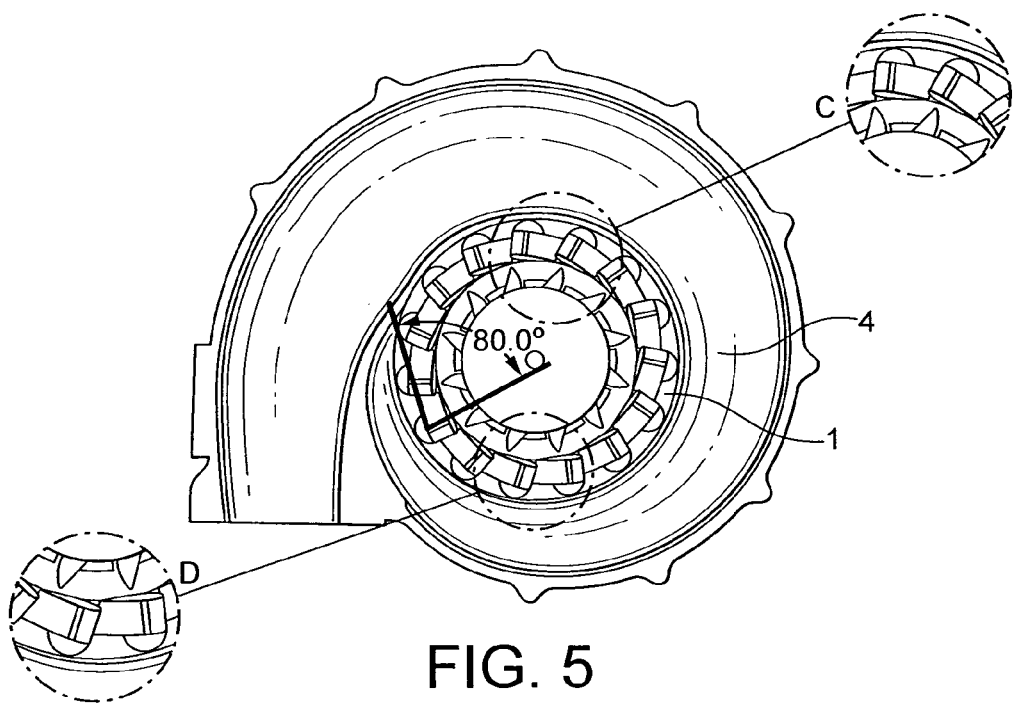
FIG. 5 is a front view of a pivoting vane ring assembly at an almost closed position (90 degrees from radial)
Figure 6A:
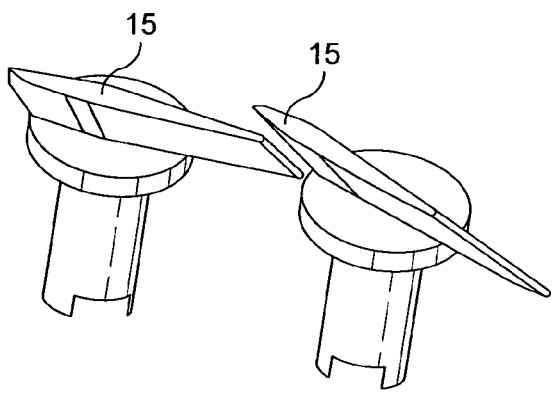
FIG. 6a shows the relative positioning of adjacent vanes at point C in FIG. 5.
Figure 6B:
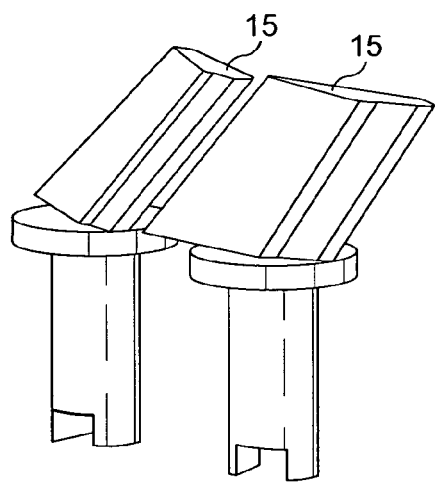
FIG. 6b shows the relative positioning of adjacent vanes at point D in FIG. 5.

As is shown in FIGS. 2a and 2b, each vane 3 consists of an inner airfoil surface 12 facing the mixed flow rotor 18 (see FIG. 7a) within the turbine 4 and an outer airfoil surface 13 opposite it. Each vane 3 is constructed straight without camber. Each vane 3 has increasing cross-sectional area spanwise from top (radially innermost) to the bottom (radially outermost), such that the bottom surface 14 area is 16.7% greater than the top surface 15 area. The increase in cross-sectional area is achieved by increasing the chord length of the vane 3, from the fixed leading edge 16, facing inlet airflow. Thus, in span-wise direction, each vane 3 has constant leading edge 16 width, whereas the trailing edge 17 advances further towards the mixed flow rotor, from top 15 to bottom 14. This creates a wedge shaped trailing edge 17 for each vane 3.

Figure 7A:
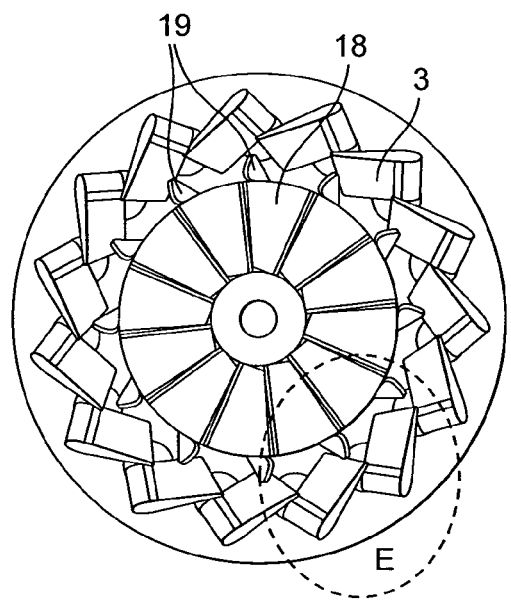
FIG. 7a shows a pivoting vane ring in situ with a mixed flow rotor.
Figure 7B:
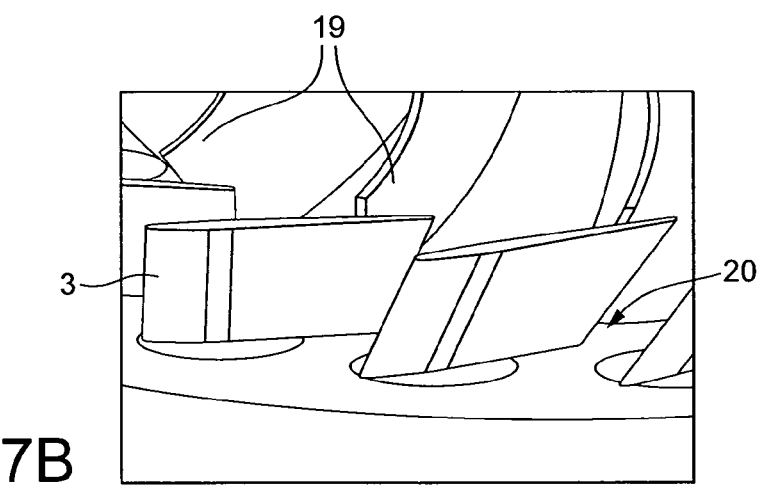
Figure 7C:
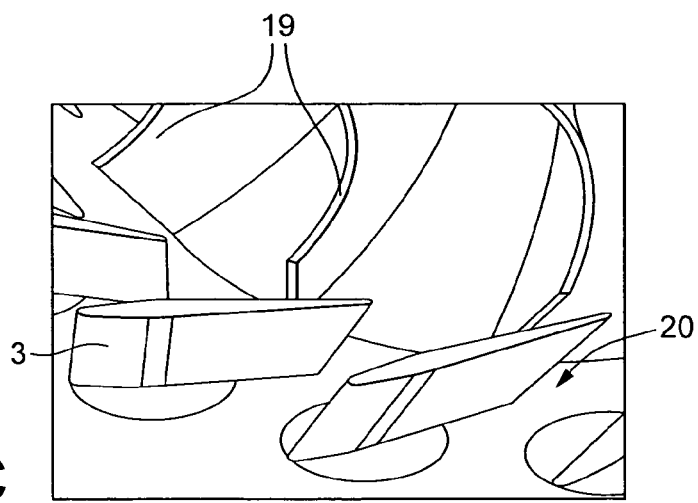

As can be seen in FIGS. 7a to 7c, the vane ring 1 is positioned within the turbine volute, upstream of the mixed flow rotor 18, such that in order to reach the blades 19 of the mixed flow rotor 18, exhaust gas must be channelled through the gaps 20 between adjacent vanes 3.

According to this embodiment, the vane ring 1 is constructed with 15 vanes 3 placed equally in a 62 millimeter radius circular ring area. As shown in FIGS. 3 to 6b, the vane ring assembly enables pivoting of the vane ring 1 about an axial direction between a fully open position where the plane of the outer airfoil surface 13 of each vane 3 is at 40 degrees from radial, to almost closed at 80 degrees from radial. Whilst the optimum angle range for the embodiment shown here is 40 degrees to 80 degrees, for any given embodiment the optimum range between the open and closed positions will depend on input conditions such as the amount of energy fed to the turbine from the engine. In the general case, the turbocharger is at its most efficient when the vanes are angled at between 60 and 70 degrees to radial.

Each vane 3 is inclined in order to match the leading edge of the mixed flow rotor 18. The inclination angle (considered relative to the surface of the turbine volute) is equal to the mixed flow rotor's 18 cone angle. In the embodiment shown in FIG. 2b, the mixed flow rotor's 18 cone angle is 50°, so the inclination angle is 40°. This ensures that the vane nozzle direction is oriented accurately towards the leading edge of the mixed flow rotor 18.

Figure 8:
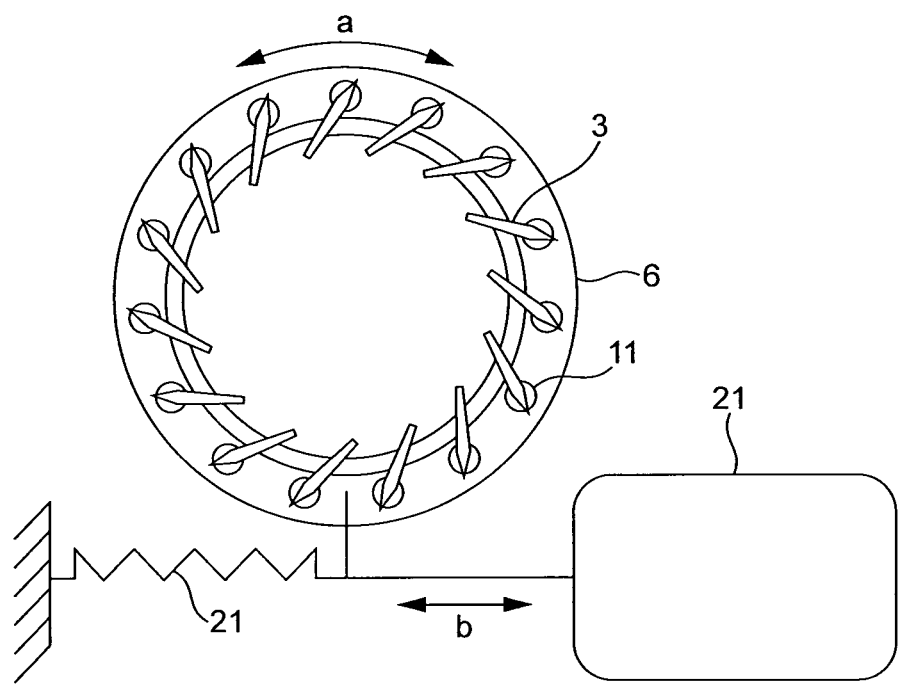
FIG. 8 shows an example damping arrangement.

In order to achieve the advantages set out herein the flow restrictor provides variable restriction in relation to pressure pulses by virtue of a bias against the flow direction. Referring to FIG. 8, that bias is applied in one embodiment by a resilient biasing means provided in conjunction with the vane ring 1 and a damping means coupled to the biasing means. In particular, a spring 22 and damping mechanism 21 are connected to the vane ring 1 acting as a vane linkage to bias it to urge the vanes 3 in a direction having a component contrary to the flow direction. The level of restriction on the nozzle ring 1 movement depends on the choice of mechanism and also the amount of load acting on it, which is the resultant of surface force on the vanes 3. The damping mechansim may be an electrodynamic shaker 21 which, together with spring 22 is used to preload the nozzle ring 1 and provide restriction to its movement. The pivoting mechanism disk 6 moves in the direction shown by arrow a when oscillating due to the force of the incoming pressure pulses and opposing biasing force. The electrodynamic shaker 21 moves in the direction shown by arrow b to provide a damping force, together with the spring 22. The shaker 21 is connected to the flow restrictor 1 such that the rotational oscillatory movement of the pivoting mechanism disk 6 is translated into reciprocating linear motion of the shaker 21. This may be achieved, for example, by means of outward projections (not shown) on the flow restrictor 1 which attach to receiving arms of a pivotable yoke (not shown). Oscillation of the mechanism disk 6 yoke causes the yoke to pivot and the projections are also pivotable to allow in translation of the pivoting action of the yoke into the reciprocating linear motion by the flow restricting member 1. Of course, only the spring 22 may be employed without the damper 21. Alternative or additional biasing components may be employed as appropriate, with or without being combined with a damping means as appropriate. Alternatively, each vane 3 can include a respective biasing spring or other component.

The biasing means, in this case the spring 22, together with a damper, if one is used as in this case (shaker 21), has an appropriate biasing force to provide a desired level of resistance to force applied by incoming pressure pulses and therefore a desired point at which the vanes 3 open and the nozzle 1 area increases.

The incoming pressure pulses are due to the exhaust gas pulses which have a frequency calculated by the equation:

$$N_{eng} = 60 \cdot \frac{n}{2} \cdot \frac{f_{pulse}}{G \cdot C}$$

where $N_{eng}$ is the engine speed in rpm, n is the number of strokes, $f_{pulse}$, is the exhaust flow frequency, G is the manifold group, C is the number of cylinders in the manifold group.

The spring 22 is used to allow the system to retract back to its original position once the force due to the exhaust pressure decreases. This effectively creates the natural oscillation in the nozzle ring in a manner synchronised with the exhaust pulses. If the force due to exhaust pressure is considerably high for the spring alone to restrain, the nozzle vanes 3 will tend to be overly biased towards open positions. One way of solving this is to use a stiffer spring, which resists the force to a greater extent. Alternatively, or in addition, the use of a damper 21 together with the spring 22 provides further resistance to the force. In particular, this may be advantageous in circumstances such as in an engine with very high pressure pulses. Such engines may be found, for example, in ships and power plants.

The opening and closing ability of the nozzle 1 depends on various factors. The level of incoming pressure is a first factor, with a higher pressure producing more vane 3 opening and consequently a bigger turbine volute inlet cross-sectional area (nozzle area). A second factor is the stiffness of the spring (possibly together with a damping mechanism), with higher stiffness providing more restriction to the vane 3 movement and consequently a smaller nozzle area. A third factor is the dynamic response of the oscillating system, with the response reducing with increasing frequency of the incoming pressure pulses. Furthermore, the rate of the nozzle ring 1 movement will not be the same as the rate of pressure increase/decrease in a pulse. This is due to the mass of the oscillating system. Further to this, the fluctuation within a period of pressure pulses may not be reflected in the nozzle ring 6 oscillation. Thus, pressure pulses similar to exhaust gas will naturally induce a more sinusoidal oscillation in the nozzle ring 1. Finally, the position of the pivoting point on the vanes 3 affects the use of the pressure on the vanes' surfaces for opening and closing the nozzle 1.

Before use of the turbocharger in an engine, pre-calibration may be carried out to decide on the force due to the pressure pulses, the consequent inlet area changes and the level of restriction required to maintain the nozzle area at an optimum region, and therefore the appropriate biasing force to effectively balance the force of the incoming pressure pulses to achieve optimum oscillation of the vanes 3.

In the settings used in the example shown in FIGS. 8 to 10 (FIGS. 9 and 10 being discussed below), for 20 Hz the pressure pulse fluctuates from slightly above atmospheric to almost 2.4 Bar. This creates almost a full range of vane angle movement at low stiffness but becomes limited at high stiffness. The mass of the oscillation components (nozzle vanes and the driving ring) also play a role in this matter. In an engine application, this may be also be considered during calibration.

The spring stiffness may be varied by preloading it at various stages. Alternatively different springs may be used for different stiffness. The calibration of the appropriate stiffness level may be conducted with the turbine subjected to pressure pulses and monitoring the fluctuation in the nozzle vane opening/closing. This may be repeated for a range of stiffness and the point which provides maximum opening and closing with the mean value at the optimum vane angle may be ideally chosen as the mode for operation. For the examples shown in FIGS. 9 and 10, the optimum vane angle is in the range of 60°-65° (respect to radial direction), the maximum opening and closing is between 40° and 80° vane angle (respect to radial direction). These values vary depending on the type of turbine under consideration and its nozzle opening limitation.

In the example in FIG. 8, as discussed above a shaker 21 and an external spring 22 are used to provide the natural oscillation needed. The stiffness of the spring in the shaker 21 is 12.3 N/mm. The stiffness of the external spring 22 is calculated based on the equation, $$\text{Force} = 0.72\Delta x + 43.38 \quad \longleftarrow \text{Preload}$$

Length of spring extension/compression

The stiffness of the spring at its original length is 43.38 N/mm. To increase the stiffness it is preloaded by stretching and extending its length. Thus its stiffness will increase 0.72 N/mm for every mm. These are example values only, specific to these particular circumstances.

In operation, during an exhaust valve cycle, just after the exhaust valve has opened and the exhaust gas pressure is low, the force on the vane arms 11 is lower than the force needed to overcome the opposing force of the biasing component biasing the vanes 3 towards a closed position. Therefore the force is too low to cause the vanes 3 to open. This means that the pivoting mechanism disk 6 is positioned such that the angle to the radial of each vane 3 is high and the gaps 20 through which the exhaust gas can flow are restricted, so that the gas pressure is boosted. Conversely, when the exhaust valve is fully open and exhaust gas pressure is at its peak, the force on the vane arms 11 is sufficient to overcome the biasing force and move the vanes 3 to an open position where the angle is lower so that the gaps 20 between adjacent vanes 3 provide a greater cross sectional area through which the gas can flow. This prevents the already high inlet pressure from being further boosted and potentially exceeding engine operating limits.

A movement of a vane 3 due to the force applied by an incoming pressure pulse results in a change in orientation angle of the vane 3 causing rotation of an axial vane arm 11 about its central axis (parallel to the axial direction in the turbine). This causes the attached pivot pin 5 to rotate on the fixed distal end 9. This in turn causes rotation of the pivoting mechanism disk 6 which causes rotation of any remaining vane arms 11 not impacted directly by the pressure pulse.

Thus the changes in the stator exit area are achieved through change in the vane angle settings (with respect to the radial direction) and these changes in vane angle are the result of the natural oscillation of the nozzle vane 3 positions in response to the incoming pressure pulses from the incoming exhaust gases.

It is found that the bias provided in relation to the vanes 3 further improves efficiency of the device by virtue of the vanes' oscillation. The oscillation is made possible, in this example, by the suspension of the vanes 3 against a spring 22 in combination with a damper 21. During the increase of pressure in a pulse period (the peak of the pulse), the force on the surfaces of the vanes 3 pushes the vanes 3 against the springs and results in the nozzle opening (vane angle decreases). After the peak, during the decrease of pressure (the trough of the pulse), the springs retract the vanes 3 to a more closed position. A biasing force of a suitable magnitude opposing the force due to a pressure pulse ensures the return of the vanes 3 to a desired closed position in the trough part of a pressure wave.

FIG. 9 shows example laboratory measurements of turbine inlet pressure, vane angle, nozzle throat area and turbine power respectively over time for three different pressure pulse frequencies at 20 Hz. The turbine's mean speed is maintained at 30000 rpm (50% speed).

Figure 9A:
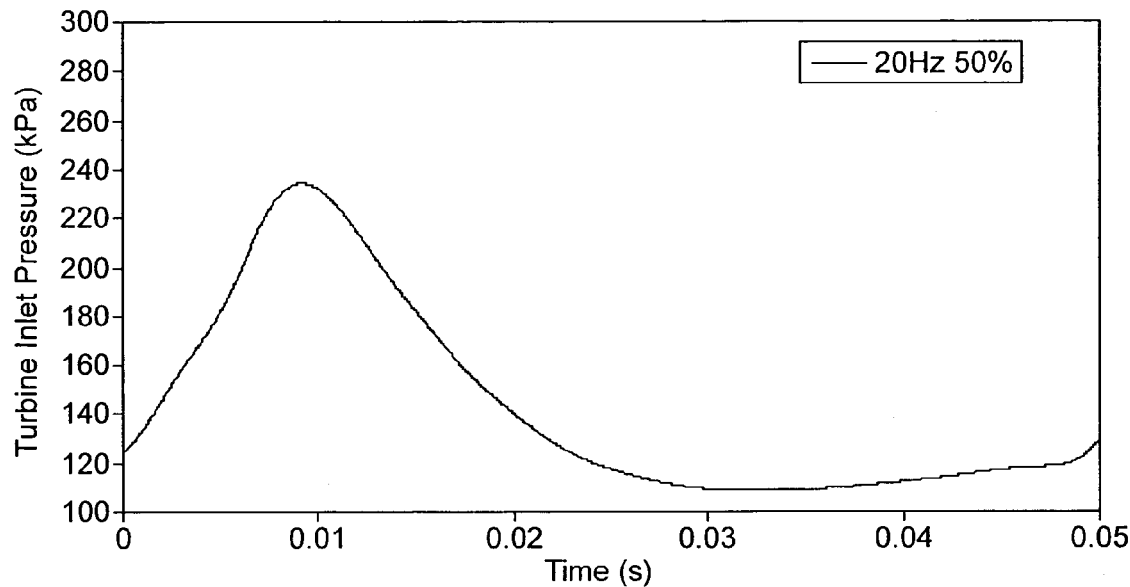
FIG. 9a is a graph showing variation of inlet static pressure at different turbine speeds over time.
Figure 9B:
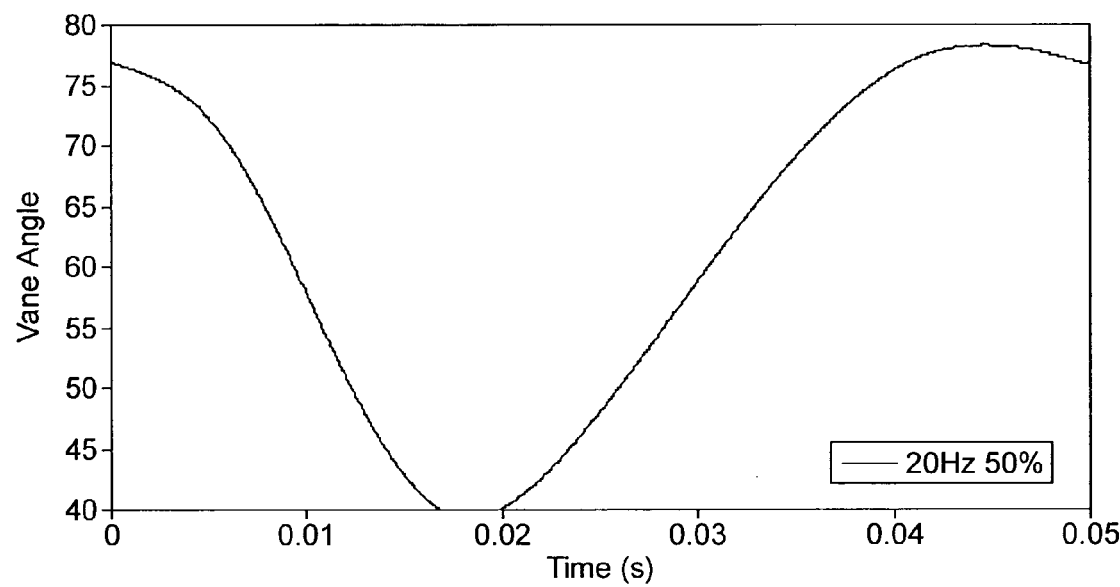
FIG. 9b is a graph showing variation of vane angle at different pulse frequencies over time.
Figure 9C:
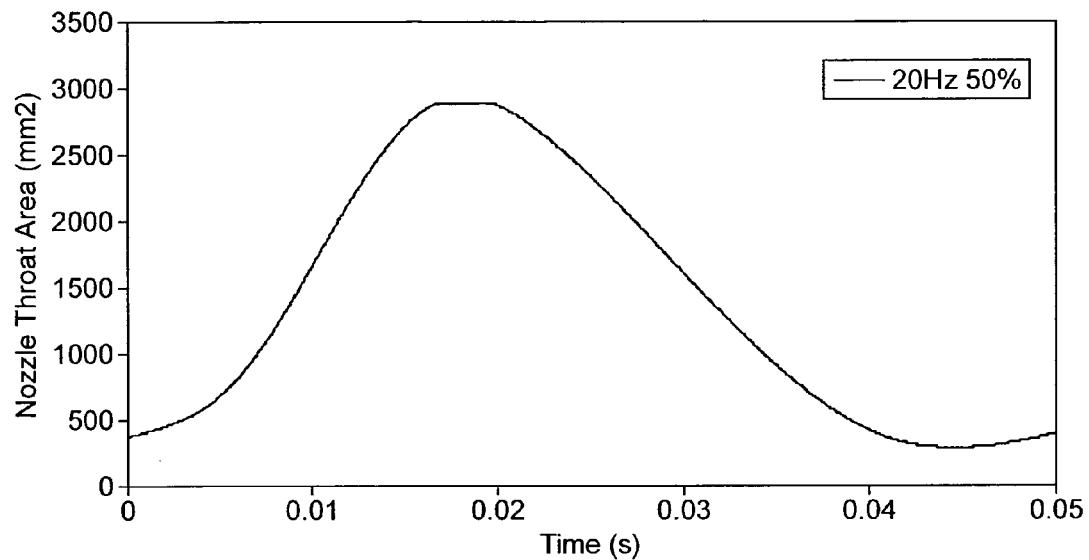
FIG. 9c is a graph showing variation in nozzle throat area at different turbine speeds over time.
Figure 9D:
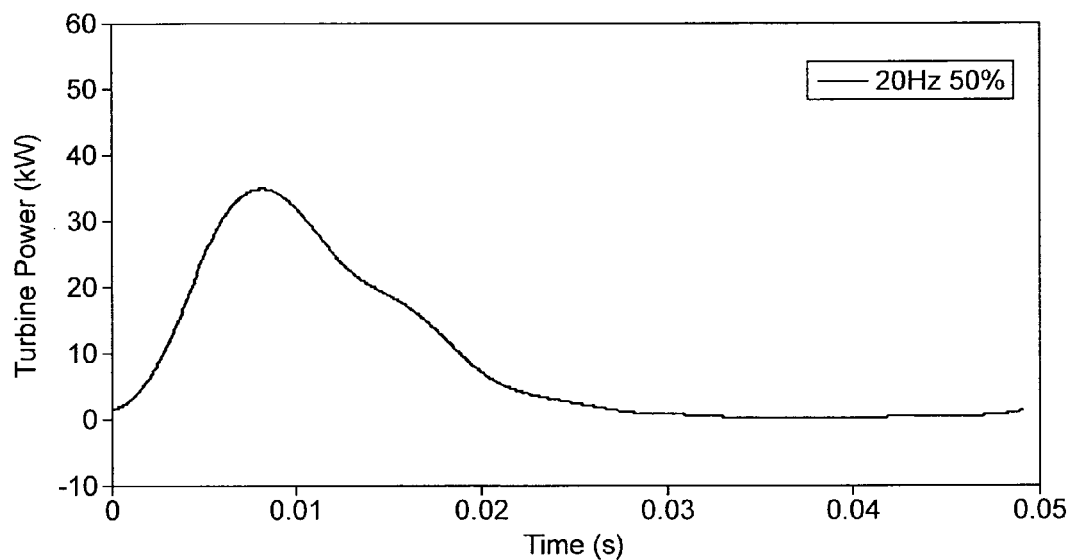
FIG. 9d is a graph showing variation in turbine power at different pulse frequencies over time.

From FIG. 9*a* it can be seen that the pressure amplitude is higher at lower frequency, thus resulting in more vane 3 opening—lower angle (FIG. 9*b*) and higher area (FIG. 9*c*).

The relatively long period of a pulse cycle at 20 Hz (evident from any of FIGS. 9*a* to 9*d*) results in the dynamic response of the nozzle ring-assembly 1 to match the pressure pulse and create a relatively large range of area variation. The corresponding turbine power is shown FIG. 9*d*.

FIG. 10 shows laboratory measurements of turbine inlet pressure, vane angle, nozzle throat area and turbine power over one pulse cycle for different damping cases (FIGS. 10*a* to 10*d* respectively) and turbine power over one pulse cycle for different vane angles (FIG. 10*e*), all for the 20 Hz pulse frequency/50% speed case shown in FIG. 9. FIG. 10*f* is a table giving numbers for the powers shown in FIGS. 10*d* and 10*e*. Case 1 is a low spring stiffness (53 N/mm) and no second spring, case 2 is a medium spring stiffness (74 N/mm) and no second spring and case 3 is a high spring stiffness (118 N/mm) and a second spring. These spring stiffnesses are specific to this embodiment and are used an example only. Different spring stiffnesses may be considered low, medium and high stiffness for different embodiments. The peak of a pulse is marked A and the trough marked B.

Figure 10A:
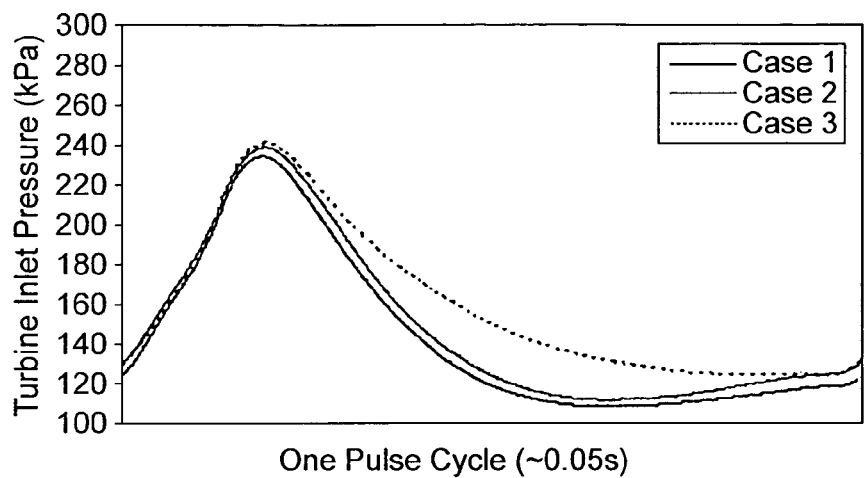
FIG. 10a is a graph showing variation of turbine inlet pressure over a pulse cycle for different cases for 20 Hz flow pulsation.
Figure 10B:
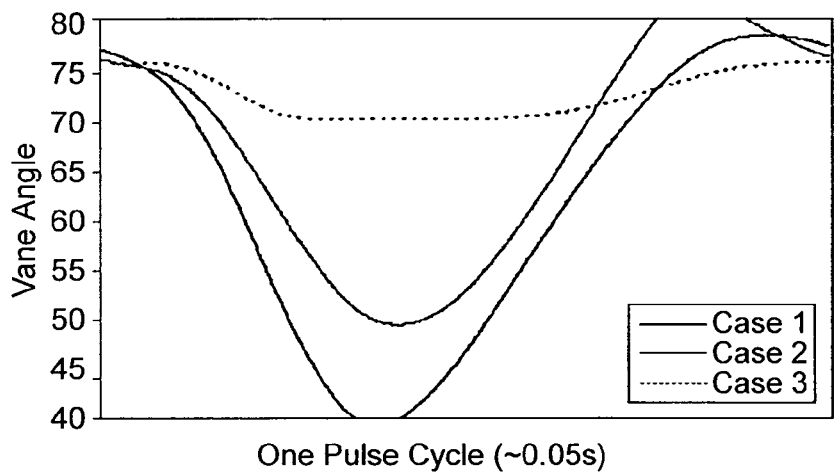
FIG. 10b is a graph showing variation of vane angle over a pulse cycle for different cases for 20 Hz flow pulsation.
Figure 10C:
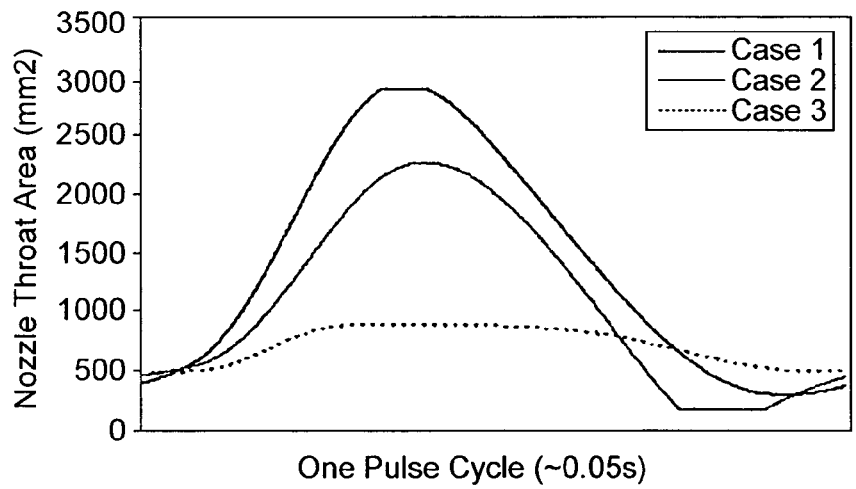
FIG. 10c is a graph showing variation of nozzle throat area over a pulse cycle for different cases for 20 Hz flow pulsation.
Figure 10D:
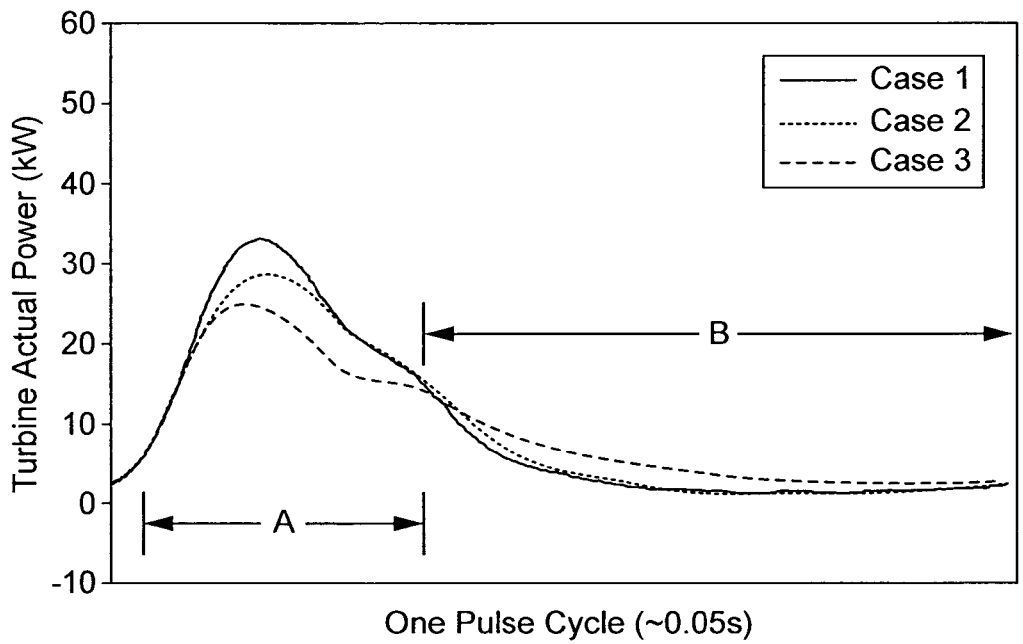
FIG. 10d is a graph showing variation of turbine power over a pulse cycle for different cases for 20 Hz flow pulsation.
Figure 10E:
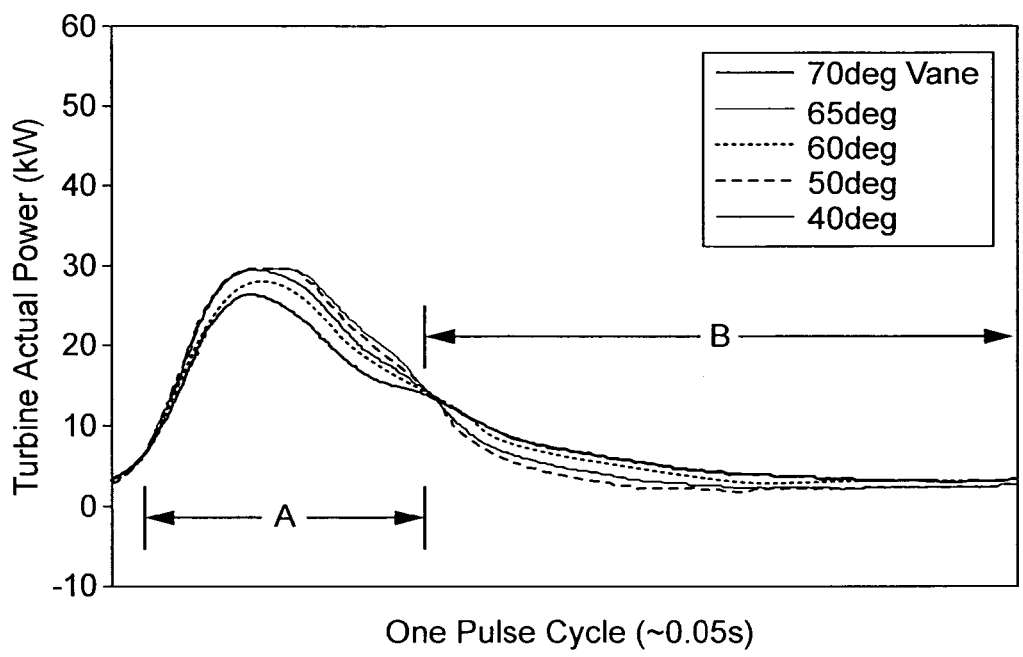
FIG. 10e is a graph showing variation of turbine power over a pulse cycle for different fixed vane settings for 20 Hz flow pulsation.

It can be seen from FIGS. 10*d*,*f* and 11*d*,*f* that increasing the spring stiffness (case 1 to case 3) results in decrease in the peak (sections A) power and increase in the trough (sections B) power, as does increasing nozzle opening (70 to 40 deg), as shown by FIGS. 10*e*,*f* and 11*e*,*f*.

For 20 Hz, cycle average power in case 1 is 6.2% higher than 65 deg vane setting and peak average power (A) in case 1 is 5.1% higher than 40 deg vane setting. Trough average power (B) in case 1 is 4.8% lower than 70 deg vane setting and trough average power (B) in case 3 is 3.8% lower than 70 deg vane setting. Case 1 is the overall best for the 20 Hz condition.

A decrease in the system dynamic response at higher frequency is observed which may result in less improvement in the cycle average power compared to at low frequencies. Therefore at higher frequencies, forced oscillation with an external mechanism may be used to increase the range of nozzle position changes, and achieve as a good an improvement in power output as for lower frequencies.

In general, it can be seen that the use of natural nozzle ring 1 oscillation is subject to a compromise between the peak and trough region of a pulse. Any effort to increase power at the trough (by reducing nozzle opening) has an associated by power reduction at the peak, which is more severe at higher frequencies. Therefore when determining the optimum arrangement and damping provision, and also any provision of additional forced oscillation as discussed above, it is necessary to take this into account.

Of course the system may be used for any pressure pulse frequency. The use of the pressure pulse to naturally oscillate the nozzle position, without any externally forced oscillation can be beneficial for example at a low frequency, such as 20 Hz, condition. This is mainly because of the longer pulse period which allows the nozzle system to adjust and cope with the incoming pressure. Examples of low frequency systems which may achieve the most benefit from having a naturally oscillating pivoting nozzle vane ring are low speed engines. Typical of low speed engines are those large diesel units used in ships and power plants. These high power engines run almost at constant low speed (minimal transient) and produces high exhaust pressure pulses. The high pressure coupled with low frequency pulses results in good dynamic response of the nozzle system (still subject to the overall mass), and therefore such engines may see a large improvement in a turbocharger's overall power when using the disclosed turbocharger.

As an alternative to the spring arrangement discussed above, any other suitable biasing arrangement could be used.

If a damper is required, any appropriate known method of damping may be used as necessary. Examples are pneumatic or hydraulic damping. The focus should be in the capacity for maximum area changes with minimal external energy input.

Furthermore, the pivoting vane nozzle 1 arrangement described herein is only one example of the implementation of the present invention. Any other implementation which allows flow restrictor movement or variation to occur in response to force acting on the flow restrictor caused by incoming pressure pulses to provide passive control of the flow restrictor in response to the natural oscillation caused by the incoming pressure pulses may be used.

The invention claimed is:

1. A passive flow control device for a passively-controlled turbocharger, the passive flow control device comprising
   a variably restricting flow restrictor for restricting flow in a turbocharger inlet by a variable amount, the flow restrictor positioned at least partially within a volute of the passively-controlled turbocharger and comprising a plurality of vanes pivotable between a plurality of flow restrictor positions around an axial direction, the passive flow control device being arranged such that the flow restrictor position varies flow restriction in response to force acting on a surface of the plurality of vanes caused by a pressure pulse in a flow direction,
   a biasing component arranged to bias the plurality of vanes in a bias direction opposed to the flow direction, and
   a damper arranged to dampen the force acting on the flow restrictor, the biasing component and the damper arranged to cause opening of the flow restrictor during the peak of the pressure pulse and closing of the flow restrictor during a trough of the pressure pulse.

2. A device according to claim 1, wherein the biasing component provides a variable force.

3. A device according to claim 1, wherein the biasing component comprises a spring.

4. A device according to claim 3, wherein the spring has variable stiffness.

5. A device according to claim 1, in which the biasing component connects the flow restrictor to a stationary component such that the flow restrictor is biased relative to the stationary component in response to the force.

6. A device according to claim 1, wherein the flow restrictor is biased in a direction substantially opposite a direction in which at least a component of the pressure pulse acts.

7. A device according to claim 1, wherein the biasing force biases the flow restrictor such that the biasing force and forces caused by a plurality of incoming pressure pulses cause the flow restrictor restriction to vary in an oscillatory manner.

8. A device according to claim 1, wherein the flow restrictor has a closed position giving a minimized turbine volute inlet cross-sectional area and an open position giving a maximized turbine volute inlet cross-sectional area and wherein the flow restrictor is biased towards the closed position such that the flow restrictor is moveable to the open position in response to a predetermined force acting on the flow restrictor caused by the pressure pulse.

9. A device according to claim 1, wherein the device further comprises a plurality of biasing components connected respectively to each vane.

10. A device according to claim 9, further comprising a vane linkage connected to the plurality of vanes, the biasing component being connected to the linkage.

11. A device according to claim 1, wherein the damper comprises an electrodynamic shaker.

12. A device according to claim 1, wherein the damper comprises a spring.

13. A turbocharger comprising a flow control device according to claim 1.

14. A vehicle or an engine comprising a turbocharger according to claim 13.

15. A device according to claim 1, further comprising a pivoting mechanism disk that is interconnected to the flow restrictor, the biasing component, and the damper.

16. A device according to claim 15, wherein the pivoting mechanism disk is movable in a rotational oscillatory manner in response to changes in the flow restrictor position and the bias of the biasing component.

17. A device according to claim 16, wherein the pivoting mechanism disk is axially aligned with the flow restrictor.

18. A method of passively controlling flow at a turbocharger inlet, the method comprising flow restriction of a variably restrictable flow restrictor in response to force acting on a surface of a plurality of vanes of the flow restrictor caused by a pressure pulse, the method comprising the steps of:
   applying a first force caused by the pressure pulse to a surface of the plurality of vanes positioned at least partially within a volute of the passively-controlled turbocharger in a flow direction;
   moving the position of the flow restrictor from a first position to a second position during a peak of the pressure pulse and in response to the first force;

ceasing applying the first force to the surface of the plurality of vanes; and moving the position of the flow restrictor from the second position to the first position during a trough of the pressure pulse and in response to the ceasing of application of the first force and under a bias in a direction opposed to the flow direction.

\* \* \* \* \*